Dec. 17, 1968     K. BEYERLE     3,416,377
MOUNTING FOR GYROS

Filed April 18, 1966     2 Sheets-Sheet 1

Inventor:
KONRAD BEYERLE.
BY
ATTORNEY.

Dec. 17, 1968     K. BEYERLE     3,416,377
MOUNTING FOR GYROS

Filed April 18, 1966     2 Sheets-Sheet 2

Inventor:
KONRAD BEYERLE.
BY *Otto Flaumenmz.*
ATTORNEY.

United States Patent Office 3,416,377
Patented Dec. 17, 1968

3,416,377
MOUNTING FOR GYROS
Konrad Beyerle, 86 Hohenstaufenallee, 51 Aachen,
Germany
Filed Apr. 18, 1966, Ser. No. 543,398
Claims priority, application Germany, Apr. 20, 1965
B 81,537
6 Claims. (Cl. 74—5)

ABSTRACT OF THE DISCLOSURE

An elastic mounting of a gyro rotor is provided by an annular member between the outer race of its gyro anti-friction bearing and the gyro housing. This enables an operation of the bearing without play and without excessive variations in the axial preload in the case of differential changes of the lengths of rotor and housing. The annular member consists of an elastic material and has, for example, spiral apertures extending axially through it. The apertures enable an elastic deformation of the member in radial and axial directions and can contain a viscous material.

---

This invention relates to a mounting for gyros, such as are used for attitude control and as stabilizers and in compasses. To ensure an operation without play and a defined position of the center of gravity of the rotor, an axial preloading of the anti-friction bearings of the rotor is required.

In the previous structures, the axial elasticity of those parts of the rotor housing which applied this preload was either too small for taking up differential, thermally induced changes in the lengths of the rotor and housing without excessive variations of the axial preload on the anti-friction bearings, or the means used for this purpose were not absolutely elastic but also subject to solid body friction so that the position of the rotor in the housing was no longer positively defined.

It is an object of the invention to provide for an elastic mounting of the rotor under a preload with the aid of an annular member in such a manner that there is no solid body friction at any point between the outer race of the anti-friction bearing and the housing. This enables an operation of the bearings without play and without excessive variations in the axial preload in the case of differential changes of the lengths of the rotor and housing.

The design according to the invention enables also a radially elastic incorporation of the anti-friction bearing in the housing. Such incorporation may be desirable for limiting the bearing forces when the rotor is unbalanced or for obtaining an isoelastic mounting.

Finally, the design of the annular member according to the invention improves the thermal stability of the anti-friction bearings, as will be explained hereinafter.

In some gyro devices, the anti-friction bearings may be incorporated by purely elastic means. In other devices, special provisions must be taken to damp vibrations. Such provisions will be described hereinafter as a development of the invention.

Figure 1:
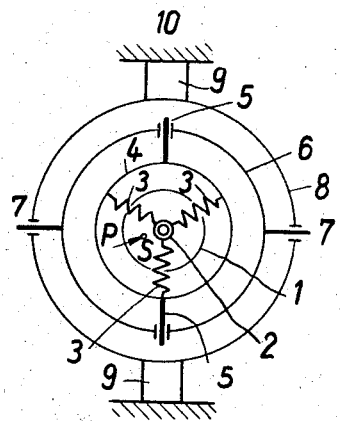
Figure 2:
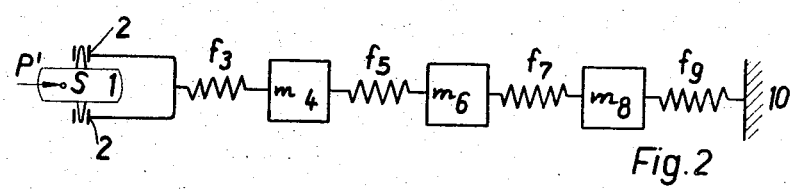
Figure 3:
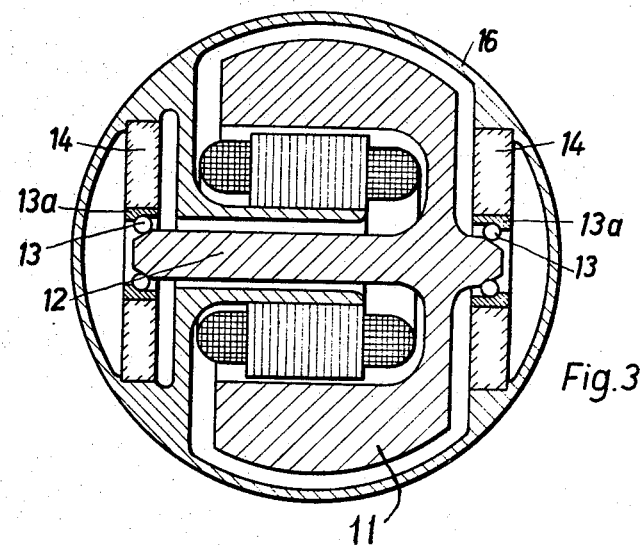
Figure 4:
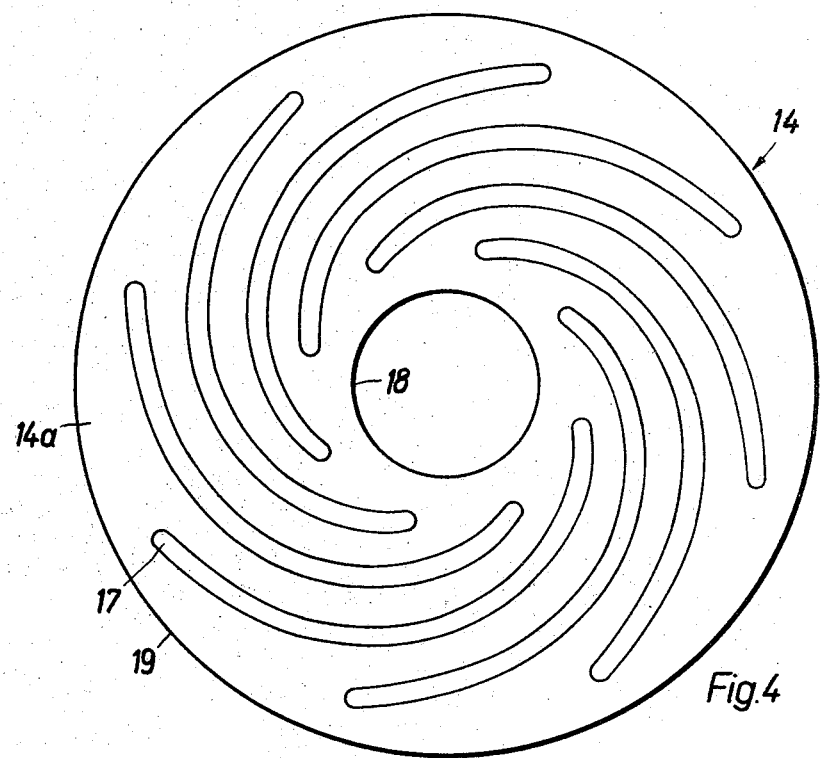
Figure 5:
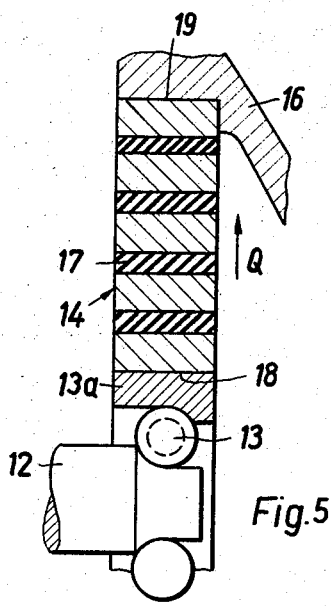
Figure 6:
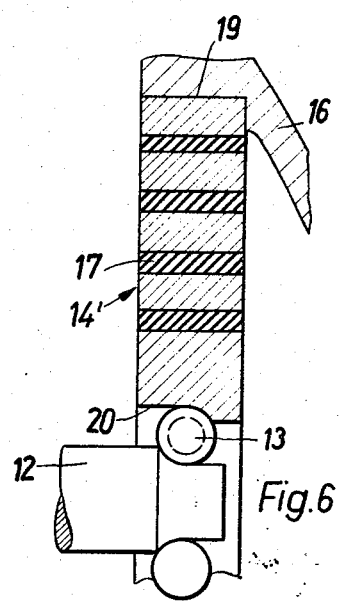

The problem underlying the invention and the means proposed in solution to this problem will now be explained more fully with reference to the accompanying drawings, in which FIG. 1 is a diagrammatic view showing a gyro mounting in vertical projection, FIG. 2 is a simplified representation showing this mounting in horizontal projection, FIG. 3 shows a mounting provided according to the invention for a bell-shaped rotor, FIG. 4 is an axial elevation showing one of the viscoelastic annular discs and FIGS. 5 and 6 are axial sectional views showing two mountings according to the invention with viscoelastic discs.

Gyro devices having strictly elastic mountings are chains of elastic elements, which have mass. This may be explained with reference to FIGS. 1 and 2.

FIG. 1 shows a bell-shaped rotor 1. Its bearing 2 is connected by elastic elements 3 to the housing 4. As the rotor has a small, but inevitable residual unbalance, its center of gravity S gyrates in accordance with its eccentricity about the axis of the bearing. This axis is non-stationary too. The housing 4 may be rotatably mounted in a gimbal ring 6, e.g., by bearings 5. This gimbal ring may be succeeded by further bearings 7 and suspension parts 8, which are then connected by a strap 9 to the mass 10 of the vehicle. In the present discussion, this mass may be considered infinite.

Disturbing vibrations can be imparted to such assemblies from the outside as well as by an unbalance of the rotor, i.e., from the inside. In the latter case, the vibrating force may be the centrifugal force P of the unbalance. This centrifugal force gyrates at the angular velocity of the rotor. The horizontal projection of this centrifugal force is indicated at P' in FIG. 2. The assumedly rigid masses of suspension elements 4, 6, 8 are indicated at $m_4$, $m_6$, $m_8$, respectively. The actual elasticity of the suspension elements and their connections is represented by the springs $f_3$, $f_5$, $f_7$ and $f_9$. Depending on the design of a particular device, branches consisting of springs and masses would have to be added. Such vibratable systems have a large number of natural frequencies and when vibrated at these frequencies give rise at various points to greatly increased amplitudes of vibration due to resonance. Such resonance effects will disturb the function of parts that are sensitive to vibration, such as accelerometers and contacts, and apply stress to bearings and rigid connections. It is not always possible to adopt a design in which the natural frequencies are far from the operating frequency of the gyro. This applies mainly to the stable platforms and rate gyros which are used in aircraft instrumentation, particularly because these devices comprise gyros which have relatively rigid shafts.

In the design of machines and apparatus it is generally known to reduce the excessive resonance effects of such systems by the interposition of vibration dampers consisting of rubberlike, viscoelastic substances so that a much smoother operation is obtained. Such viscoelastic mountings in their usual forms cannots be readily applied in the present case because the rotor must be maintained in a predetermined position relative to the housing in order to avoid unallowable displacements of the center of gravity. Besides, the elastic constants of the mounting in the axial and radial directions must not change with time.

For this reason, viscoelastic elements have previously been incorporated only in the connections between complete systems and the support, such as the ship or aircraft, whereas all bearing and suspension elements in the systems themselves were made of purely elastic materials, which were as form-retaining as possible, preferably of steel. With such materials, however, an operation which is reasonably free of disturbing vibration is possible only if the unbalance of the rotor is minimized.

According to the invention the elasticity of the annular connection between the anti-friction bearing and the gyro housing is obtained by a suitable arrangement of apertures in the connection.

In a development of the invention, the apertures may have a substantially spiral configuration. The cross-sections of the lands between the apertures and the initial and final radii of these lands and their center angle may be selected to provide for axial and radial elasticities which may be varied within large ranges and are independent of each other. For an isoelastic mounting, these elasticities may be made equal when this is desired.

In a further embodiment of the invention, the above-mentioned resonance effects are minimized in that the apertures are filled with a viscous material so that the annular apertured member is capable of damping vibrational energy.

The annular member may constitute a part of the gyro housing, in which the outer race of a normal anti-friction bearing is inserted. Alternatively, the annular member may constitute a separate element of construction for mechanically connecting the outer race to the rotor housing. Finally, the assembly may be simplified in that the outer race of the anti-friction bearing is radially enlarged and provided with the apertures which provide for the elasticity.

In the embodiment shown in FIG. 3, the bell-shaped flywheel body 11 has a shaft 12, which is mounted in ball bearings 13—13a. The outer race 13a of each bearing is mounted in the central opening of a viscoelastic disc 14, by which the race is held in the housing 16 containing the flywheel.

According to FIG. 4, each of the viscoelastic discs 14 consists of a steel body 14a, which has apertures 17 in the form of Archimedean spirals. These apertures extend axially through the disc, as is shown in FIG. 5. The apertures contain a viscous plastics material, such as silicone rubber. If the plastics material may not be held firmly enough in the apertures, the side faces of the steel body 14a may also be coated with the plastics material so that the plastics material portions filling the apertures are interconnected. Owing to the spiral configuration of the apertures 17, the seat 18 for the outer race 13a of the ball bearing can be elastically displaced in axial and radial directions relative to the rim 19 of the disc. This rim fits the housing 16.

According to FIG. 5, the outer race 13a is disposed within the disc 14. In the embodiment shown in FIG. 6, the inner portion of the disc 14' is formed with a raceway 20 for the bearing balls 13.

The thermal stability of the mounting is improved for the following reason. The heat Q which is generated in the ball bearing or supplied from the gyro shaft flows in FIG. 5 through the viscoelastic disc 14 and is dissipated by the housing 16. If the ball bearing were inserted in a solid steel disc, the temperature gradient which is due to the heat flow would give rise to thermally induced strains, whereby the bearing balls 13 would be forced from the outside against the shaft 12. This might reduce or eliminate the very small radial play of the balls. As a result, the friction losses and with them the temperature of the bearing would further increase and the bearing would become overheated under these circumstances.

The viscoelastic disc provided according to the invention permits an almost free expansion of the outer race 13a of the bearing because the yielding spiral disc of the steel body 14a between the apertures 17 enable a thermal expansion of the raceway of the outer race almost without a consumption of forces. The same applies to a disc as shown in FIG. 6.

What is claimed is:

1. In a gyro device, a mounting which comprises a suspended bearing support, an anti-friction bearing including revolvable members and an outer race confining said revolvable members, a rotor shaft rotatably mounted in said bearing, an annular member connecting said support to said outer race and consisting of an elastic, highly form-retaining material and formed with apertures which extend axially through said annular member and enable an elastic deformation of said annular member in radial and axial directions, said apertures having a substantially spiral configuration, and viscous material contained in said apertures.

2. A mounting as set forth in claim 1, in which said revolvable members comprise balls.

3. A mounting as set forth in claim 1, in which said viscous material is a viscous plastics material.

4. A mounting as set forth in claim 1, in which said outer race is integral with said annular member.

5. A mounting as set forth in claim 1, in which said apertures (17) have an Archimedean spiral configuration.

6. A mounting as set forth in claim 1, in which the radial and axial elasticities are equal, whereby an isoelastic mounting is obtained.

References Cited

UNITED STATES PATENTS

| 2,760,359 | 8/1956 | Wildhaber | 308—184 |
|---|---|---|---|
| 2,874,008 | 2/1959 | Orte et al. | 308—184 |
| 2,885,583 | 5/1959 | Zunick et al. | 308—184 |
| 2,887,784 | 5/1959 | Carter | 74—5 |
| 3,071,421 | 1/1963 | Jones et al. | 74—5 |
| 3,097,022 | 7/1963 | Sernetz | 308—184 |

FOREIGN PATENTS 926,398   5/1955   Germany.

C. J. HUSAR, Primary Examiner.

U.S. Cl. X.R.

308—184